(12) United States Patent
Dunn (10) Patent No.: US 10,319,408 B2
(45) Date of Patent: Jun. 11, 2019

(54) MONOLITHIC DISPLAY WITH SEPARATELY CONTROLLABLE SECTIONS

(71) Applicant: Manufacturing Resources International, Inc., Alpharetta, GA (US)

(72) Inventor: William Dunn, Alpharetta, GA (US)

(73) Assignee: MANUFACTURING RESOURCES INTERNATIONAL, INC., Alpharetta, GA (US)

(*) Notice: Subject to any disclaimer, the term of this patent is extended or adjusted under 35 U.S.C. 154(b) by 0 days.

(21) Appl. No.: 15/084,968

(22) Filed: Mar. 30, 2016

(65) Prior Publication Data

US 2016/0293206 A1    Oct. 6, 2016

Related U.S. Application Data

(60) Provisional application No. 62/140,164, filed on Mar. 30, 2015.

(51) Int. Cl.
*G11B 20/10* (2006.01)

(52) U.S. Cl.
CPC .............................. *G11B 20/10527* (2013.01)

(58) Field of Classification Search
CPC . G09G 2370/027; G09G 2370/12; H04N 5/14
USPC ................ 386/225; 348/739, 794, 588, 564; 345/204, 1.3, 635; 715/765
See application file for complete search history.

(56) References Cited

U.S. PATENT DOCUMENTS

| | | | |
|---|---|---|---|
| 4,271,410 A | 6/1981 | Crawford |
| 4,399,456 A | 8/1983 | Zalm |
| 4,456,910 A | 6/1984 | DiMassimo et al. |
| 4,571,616 A | 2/1986 | Haisma et al. |

(Continued)

FOREIGN PATENT DOCUMENTS

| | | |
|---|---|---|
| CN | 1613264 A | 5/2005 |
| CN | 101777315 A | 7/2010 |

(Continued)

OTHER PUBLICATIONS

AMS AG, TC53404, TCS3414, Digital Color Sensors, Apr. 2011, 41 pages, Texas Advanced Optoelectronic Solutions Inc. is now ams AG.

(Continued)

*Primary Examiner* — Thai Q Tran
*Assistant Examiner* — Stephen R Smith
(74) *Attorney, Agent, or Firm* — Standley Law Group LLP; Jeffrey S. Standley; Eric M. Gayan (57) ABSTRACT

The exemplary embodiments herein disclose an electronic display assembly using a monolithic electronic display panel with a single video player in electrical connection with a single timing and control board (TCON) which is in electrical connection with the monolithic electronic display panel. The single video player and TCON are adapted to transmit a combination of both still images and full motion video to be shown simultaneously on the electronic display. Different areas of the display can be used to show different content, either video or still images. Bezels can be graphically generated between the images, which can change shape, location, or be removed altogether as the display content changes.

20 Claims, 8 Drawing Sheets

(56) References Cited

U.S. PATENT DOCUMENTS

| | | |
|---|---|---|
| 4,593,978 A | 6/1986 | Mourey et al. |
| 4,753,519 A | 6/1988 | Miyatake |
| 5,029,982 A | 7/1991 | Nash |
| 5,049,987 A | 9/1991 | Hoppenstein |
| 5,081,523 A | 1/1992 | Frazier |
| 5,088,806 A | 2/1992 | McCartney et al. |
| 5,115,229 A | 5/1992 | Shalit |
| 5,162,645 A | 11/1992 | Wagensonner et al. |
| 5,162,785 A | 11/1992 | Fagard |
| 5,351,201 A | 9/1994 | Harshbarger, Jr. et al. |
| 5,402,141 A | 3/1995 | Haim et al. |
| 5,565,894 A | 10/1996 | Bates et al. |
| 5,656,824 A | 8/1997 | den Boer et al. |
| 5,663,952 A | 9/1997 | Gentry, Jr. |
| 5,694,141 A | 12/1997 | Chee |
| 5,751,346 A | 5/1998 | Dozier et al. |
| 5,835,074 A | 11/1998 | Didier et al. |
| 5,886,731 A | 3/1999 | Ebisawa |
| 6,027,222 A | 2/2000 | Oki et al. |
| 6,032,126 A | 2/2000 | Kaehler |
| 6,055,012 A | 4/2000 | Haskell et al. |
| 6,075,556 A | 6/2000 | Urano et al. |
| 6,091,777 A | 7/2000 | Guetz et al. |
| 6,094,457 A | 7/2000 | Linzer et al. |
| 6,100,906 A | 8/2000 | Asaro et al. |
| 6,153,985 A | 11/2000 | Grossman |
| 6,192,083 B1 | 2/2001 | Linzer et al. |
| 6,259,492 B1 | 7/2001 | Imoto et al. |
| 6,292,157 B1 | 9/2001 | Greene et al. |
| 6,292,228 B1 | 9/2001 | Cho |
| 6,297,859 B1 | 10/2001 | George |
| 6,326,934 B1 | 12/2001 | Kinzie |
| 6,359,390 B1 | 3/2002 | Nagai |
| 6,392,727 B1 | 5/2002 | Larson et al. |
| 6,417,900 B1 | 7/2002 | Shin et al. |
| 6,421,103 B2 | 7/2002 | Yamaguchi |
| 6,421,694 B1 | 7/2002 | Nawaz et al. |
| 6,428,198 B1 | 8/2002 | Saccomanno et al. |
| 6,536,041 B1 | 3/2003 | Knudson et al. |
| 6,546,294 B1 | 4/2003 | Kelsey et al. |
| 6,553,336 B1 | 4/2003 | Johnson et al. |
| 6,587,525 B2 | 7/2003 | Jeong et al. |
| 6,642,666 B1 | 11/2003 | St-Germain |
| 6,674,463 B1 | 1/2004 | Just et al. |
| 6,690,726 B1 | 2/2004 | Yavits et al. |
| 6,697,100 B2 | 2/2004 | Tatsuzawa |
| 6,698,020 B1 | 2/2004 | Zigmond et al. |
| 6,712,046 B2 | 3/2004 | Nakamichi |
| 6,812,851 B1 | 11/2004 | Dukach et al. |
| 6,820,050 B2 | 11/2004 | Simmon et al. |
| 6,825,899 B2 | 11/2004 | Kobayashi |
| 6,850,209 B2 | 2/2005 | Mankins et al. |
| 6,996,460 B1 | 2/2006 | Krahnstoever et al. |
| 7,038,186 B2 | 5/2006 | De Brabander et al. |
| 7,057,590 B2 | 6/2006 | Lim et al. |
| 7,103,852 B2 | 9/2006 | Kairis, Jr. |
| 7,136,415 B2 | 11/2006 | Yun et al. |
| 7,174,029 B2 | 2/2007 | Agostinelli et al. |
| 7,304,638 B2 | 12/2007 | Murphy |
| 7,307,614 B2 | 12/2007 | Vinn |
| 7,319,862 B1 | 1/2008 | Lincoln et al. |
| 7,358,851 B2 | 4/2008 | Patenaude et al. |
| 7,385,593 B2 | 6/2008 | Krajewski et al. |
| 7,391,811 B2 | 6/2008 | Itoi et al. |
| 7,480,042 B1 | 1/2009 | Phillips et al. |
| 7,518,600 B2 | 4/2009 | Lee |
| 7,573,458 B2 | 8/2009 | Dunn |
| 7,581,094 B1 | 8/2009 | Apostolopoulos et al. |
| 7,614,065 B2 | 11/2009 | Weissmueller et al. |
| 7,636,927 B2 | 12/2009 | Zigmond et al. |
| 7,669,757 B1 | 3/2010 | Crews et al. |
| 7,714,834 B2 | 5/2010 | Dunn |
| 7,764,280 B2 | 7/2010 | Shiina |
| 7,810,114 B2 | 10/2010 | Flickinger et al. |
| 7,813,694 B2 | 10/2010 | Fishman et al. |
| 7,825,991 B2 | 11/2010 | Enomoto |
| 7,924,263 B2 | 4/2011 | Dunn |
| 7,937,724 B2 | 5/2011 | Clark et al. |
| 7,988,849 B2 | 8/2011 | Biewer et al. |
| 8,130,836 B2 | 3/2012 | Ha |
| 8,212,921 B2 | 7/2012 | Yun |
| 8,218,812 B2 | 7/2012 | Sugimoto et al. |
| 8,242,974 B2 | 8/2012 | Yamazaki et al. |
| 8,350,799 B2 | 1/2013 | Wasinger et al. |
| 8,400,570 B2 | 3/2013 | Dunn et al. |
| 8,417,376 B1 | 4/2013 | Smolen |
| 8,441,574 B2 | 5/2013 | Dunn et al. |
| 8,605,121 B2 | 12/2013 | Chu et al. |
| 8,689,343 B2 | 4/2014 | De Laet |
| 8,704,752 B2 | 4/2014 | Wasinger et al. |
| 8,823,630 B2 | 9/2014 | Roberts et al. |
| 9,026,686 B2 | 5/2015 | Dunn et al. |
| 9,031,872 B1 * | 5/2015 | Foster .................... G06F 3/147 340/5.91 |
| 9,582,157 B1 * | 2/2017 | Chatterjee ......... G06F 17/30781 |
| 2001/0019454 A1 | 9/2001 | Tadic-Galeb et al. |
| 2002/0018522 A1 | 2/2002 | Wiedenmann |
| 2002/0026354 A1 | 2/2002 | Shoji et al. |
| 2002/0112026 A1 | 8/2002 | Fridman et al. |
| 2002/0118320 A1 | 8/2002 | Bayrle et al. |
| 2002/0120721 A1 | 8/2002 | Eilers et al. |
| 2002/0147648 A1 | 10/2002 | Fadden et al. |
| 2002/0154138 A1 | 10/2002 | Wada et al. |
| 2002/0163513 A1 | 11/2002 | Tsuji |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0098881 A1 | 5/2003 | Nolte et al. |
| 2003/0117428 A1 | 6/2003 | Li et al. |
| 2003/0125892 A1 | 7/2003 | Edge |
| 2003/0161354 A1 | 8/2003 | Bader et al. |
| 2003/0177269 A1 | 9/2003 | Robinson et al. |
| 2003/0196208 A1 | 10/2003 | Jacobson |
| 2003/0202605 A1 | 10/2003 | Hazra et al. |
| 2003/0227428 A1 | 12/2003 | Nose |
| 2004/0012722 A1 | 1/2004 | Alvarez |
| 2004/0114041 A1 | 6/2004 | Doyle et al. |
| 2004/0138840 A1 | 7/2004 | Wolfe |
| 2004/0194131 A1 | 9/2004 | Ellis et al. |
| 2004/0207738 A1 | 10/2004 | Wacker |
| 2004/0252187 A1 | 12/2004 | Alden |
| 2005/0005302 A1 | 1/2005 | Zigmond et al. |
| 2005/0012734 A1 | 1/2005 | Johnson et al. |
| 2005/0046951 A1 | 3/2005 | Sugihara et al. |
| 2005/0071252 A1 | 3/2005 | Henning et al. |
| 2005/0123001 A1 | 6/2005 | Craven et al. |
| 2005/0127796 A1 | 6/2005 | Olesen et al. |
| 2005/0134525 A1 | 6/2005 | Tanghe et al. |
| 2005/0134526 A1 | 6/2005 | Willem et al. |
| 2005/0184983 A1 | 8/2005 | Brabander et al. |
| 2005/0188402 A1 | 8/2005 | de Andrade et al. |
| 2005/0195206 A1 * | 9/2005 | Wogsberg ............. H04N 5/265 345/547 |
| 2005/0195330 A1 | 9/2005 | Zacks et al. |
| 2005/0216939 A1 | 9/2005 | Corbin |
| 2005/0253699 A1 | 11/2005 | Madonia |
| 2005/0289061 A1 | 12/2005 | Kulakowski et al. |
| 2005/0289588 A1 | 12/2005 | Kinnear |
| 2006/0087521 A1 | 4/2006 | Chu et al. |
| 2006/0150222 A1 | 7/2006 | McCafferty et al. |
| 2006/0160614 A1 | 7/2006 | Walker et al. |
| 2006/0214904 A1 | 9/2006 | Kimura et al. |
| 2006/0215044 A1 | 9/2006 | Masuda et al. |
| 2006/0244702 A1 | 11/2006 | Yamazaki et al. |
| 2007/0047808 A1 | 3/2007 | Choe et al. |
| 2007/0089152 A1 * | 4/2007 | Patten .................. G11B 27/034 725/134 |
| 2007/0094620 A1 | 4/2007 | Park |
| 2007/0120763 A1 | 5/2007 | De Paepe et al. |
| 2007/0127569 A1 | 6/2007 | Hatalker |

(56) References Cited

U.S. PATENT DOCUMENTS

| | | |
|---|---|---|
| 2007/0152949 A1 | 7/2007 | Sakai |
| 2007/0157260 A1 | 7/2007 | Walker |
| 2007/0164932 A1 | 7/2007 | Moon |
| 2007/0165955 A1 | 7/2007 | Hwang et al. |
| 2007/0168539 A1 | 7/2007 | Day |
| 2007/0200513 A1 | 8/2007 | Ha et al. |
| 2007/0211179 A1 | 9/2007 | Hector et al. |
| 2007/0247594 A1 | 10/2007 | Tanaka |
| 2007/0274400 A1 | 11/2007 | Murai et al. |
| 2007/0286107 A1 | 12/2007 | Singh et al. |
| 2007/0297172 A1 | 12/2007 | Furukawa et al. |
| 2008/0008471 A1 | 1/2008 | Dress |
| 2008/0017422 A1 | 1/2008 | Carro |
| 2008/0018584 A1 | 1/2008 | Park et al. |
| 2008/0028059 A1 | 1/2008 | Shin et al. |
| 2008/0037783 A1 | 2/2008 | Kim et al. |
| 2008/0055247 A1 | 3/2008 | Boillot |
| 2008/0074372 A1 | 3/2008 | Baba et al. |
| 2008/0093443 A1 | 4/2008 | Barcelou |
| 2008/0104631 A1 | 5/2008 | Krock et al. |
| 2008/0106527 A1 | 5/2008 | Cornish et al. |
| 2008/0112601 A1 | 5/2008 | Warp |
| 2008/0119237 A1 | 5/2008 | Kim |
| 2008/0143637 A1 | 6/2008 | Sunahara et al. |
| 2008/0163291 A1 | 7/2008 | Fishman et al. |
| 2008/0170028 A1 | 7/2008 | Yoshida |
| 2008/0174522 A1 | 7/2008 | Cho et al. |
| 2008/0201208 A1* | 8/2008 | Tie .................. G06Q 30/02 705/14.41 |
| 2008/0231604 A1 | 9/2008 | Peterson |
| 2008/0232478 A1 | 9/2008 | Teng et al. |
| 2008/0246871 A1 | 10/2008 | Kupper et al. |
| 2008/0266331 A1 | 10/2008 | Chen et al. |
| 2008/0272999 A1 | 11/2008 | Kurokawa et al. |
| 2008/0278432 A1 | 11/2008 | Ohshima |
| 2008/0278455 A1 | 11/2008 | Atkins et al. |
| 2008/0303918 A1 | 12/2008 | Keithley |
| 2008/0313046 A1 | 12/2008 | Denenburg et al. |
| 2009/0036190 A1 | 2/2009 | Brosnan et al. |
| 2009/0058845 A1 | 3/2009 | Fukuda et al. |
| 2009/0102914 A1 | 4/2009 | Collar et al. |
| 2009/0102973 A1* | 4/2009 | Harris ............... H04N 5/44591 348/565 |
| 2009/0109165 A1 | 4/2009 | Park et al. |
| 2009/0128867 A1 | 5/2009 | Edge |
| 2009/0164615 A1 | 6/2009 | Akkanen |
| 2009/0182917 A1 | 7/2009 | Kim |
| 2009/0219295 A1 | 9/2009 | Reijnaerts |
| 2009/0251602 A1 | 10/2009 | Williams et al. |
| 2009/0254439 A1 | 10/2009 | Dunn |
| 2009/0256965 A1* | 10/2009 | Moote ............... H04N 5/4403 348/564 |
| 2009/0260028 A1 | 10/2009 | Dunn et al. |
| 2009/0267866 A1 | 10/2009 | Reddy et al. |
| 2009/0273568 A1 | 11/2009 | Milner |
| 2009/0289968 A1 | 11/2009 | Yoshida |
| 2009/0313125 A1 | 12/2009 | Roh et al. |
| 2009/0315867 A1 | 12/2009 | Sakamoto et al. |
| 2010/0039366 A1 | 2/2010 | Hardy |
| 2010/0039440 A1 | 2/2010 | Tanaka et al. |
| 2010/0039696 A1 | 2/2010 | de Groot et al. |
| 2010/0042506 A1 | 2/2010 | Ravenel et al. |
| 2010/0060550 A1 | 3/2010 | McGinn et al. |
| 2010/0066762 A1 | 3/2010 | Yeh et al. |
| 2010/0083305 A1 | 4/2010 | Acharya et al. |
| 2010/0104003 A1 | 4/2010 | Dunn et al. |
| 2010/0109974 A1 | 5/2010 | Dunn et al. |
| 2010/0164986 A1* | 7/2010 | Wei .................. G06K 9/32 345/619 |
| 2010/0177157 A1 | 7/2010 | Berlage |
| 2010/0177158 A1 | 7/2010 | Walter |
| 2010/0188342 A1 | 7/2010 | Dunn |
| 2010/0194861 A1 | 8/2010 | Hoppenstein |
| 2010/0195865 A1 | 8/2010 | Luff |
| 2010/0198983 A1 | 8/2010 | Monroe et al. |
| 2010/0231563 A1 | 9/2010 | Dunn et al. |
| 2010/0238299 A1 | 9/2010 | Dunn et al. |
| 2010/0242081 A1 | 9/2010 | Dunn et al. |
| 2010/0253613 A1 | 10/2010 | Dunn et al. |
| 2010/0253778 A1 | 10/2010 | Lee et al. |
| 2011/0012856 A1 | 1/2011 | Maxwell et al. |
| 2011/0047567 A1 | 2/2011 | Zigmond et al. |
| 2011/0069018 A1 | 3/2011 | Atkins et al. |
| 2011/0074803 A1 | 3/2011 | Kerofsky |
| 2011/0078536 A1 | 3/2011 | Han et al. |
| 2011/0102630 A1 | 5/2011 | Rukes |
| 2011/0181693 A1 | 7/2011 | Lee et al. |
| 2011/0225859 A1 | 9/2011 | Safavi |
| 2011/0273482 A1 | 11/2011 | Massart et al. |
| 2012/0075362 A1 | 3/2012 | Ichioka et al. |
| 2012/0147046 A1* | 6/2012 | Chao .................. G06Q 50/10 345/641 |
| 2012/0182278 A1 | 7/2012 | Ballestad |
| 2012/0188262 A1 | 7/2012 | Rabii |
| 2012/0203872 A1 | 8/2012 | Luby et al. |
| 2012/0268495 A1 | 10/2012 | Yoshimura |
| 2012/0302343 A1 | 11/2012 | Hurst et al. |
| 2013/0021524 A1* | 1/2013 | Tang ................... G06F 3/1446 348/469 |
| 2013/0110565 A1 | 5/2013 | Means, Jr. et al. |
| 2013/0162908 A1* | 6/2013 | Son .................... H04N 5/14 348/571 |
| 2014/0043302 A1* | 2/2014 | Barnes ............... G09G 5/003 345/184 |
| 2014/0101535 A1 | 4/2014 | Kim et al. |
| 2014/0132796 A1 | 5/2014 | Prentice et al. |
| 2014/0136935 A1 | 5/2014 | Santillie et al. |
| 2014/0139116 A1 | 5/2014 | Reed |
| 2014/0184547 A1* | 7/2014 | Tokunaga ............. G09G 5/14 345/173 |
| 2014/0245148 A1* | 8/2014 | Silva ................. H04N 5/44591 715/719 |
| 2014/0333541 A1 | 11/2014 | Lee et al. |
| 2014/0361969 A1 | 12/2014 | Wasinger et al. |
| 2014/0375704 A1 | 12/2014 | Bi et al. |
| 2015/0070340 A1* | 3/2015 | Trachtenberg ...... H04N 21/4122 345/211 |
| 2015/0253937 A1* | 9/2015 | Kim .................. G06F 3/0488 715/765 |
| 2015/0312488 A1 | 10/2015 | Kostrzewa et al. |
| 2015/0382072 A1* | 12/2015 | Lee .................... H04N 21/4221 348/565 |
| 2016/0014103 A1 | 1/2016 | Masters et al. |
| 2016/0034240 A1* | 2/2016 | Kreiner ............... G06F 3/1446 348/383 |
| 2016/0055823 A1* | 2/2016 | Feng .................. G09G 3/3426 345/690 |
| 2016/0063954 A1 | 3/2016 | Ryu |
| 2016/0125777 A1 | 5/2016 | Knepper et al. |
| 2016/0293206 A1 | 10/2016 | Dunn |
| 2016/0335705 A1 | 11/2016 | Williams et al. |
| 2016/0358357 A1 | 12/2016 | Dunn et al. |
| 2017/0111486 A1 | 4/2017 | Bowers et al. |
| 2017/0278440 A1 | 9/2017 | Dunn et al. |
| 2017/0346584 A1 | 11/2017 | De Laet et al. |

FOREIGN PATENT DOCUMENTS

| | | |
|---|---|---|
| CN | 102246196 A | 11/2011 |
| EP | 0313331 A2 | 4/1989 |
| EP | 1640337 A2 | 3/2006 |
| EP | 2332120 A2 | 6/2011 |
| EP | 2401736 A2 | 1/2012 |
| EP | 2401869 A2 | 1/2012 |
| ID | 0514488 A | 9/2011 |
| JP | 2002064842 A | 2/2002 |
| JP | 2002209230 A | 7/2002 |
| JP | 2002366121 A | 12/2002 |
| JP | 2005236469 A | 9/2005 |
| JP | 2006184859 A | 7/2006 |
| JP | 2008034841 A | 2/2008 |
| JP | 2008165055 A | 7/2008 |

(56) References Cited

FOREIGN PATENT DOCUMENTS

| | | | |
|---|---|---|---|
| JP | 2009009422 | A | 1/2009 |
| KR | 20000021499 | A | 4/2000 |
| KR | 20020072633 | A | 9/2002 |
| TW | 200403940 | A | 3/2004 |
| WO | WO9608892 | A1 | 3/1996 |
| WO | NWO2006089556 | A1 | 8/2006 |
| WO | WO2006111689 | A1 | 10/2006 |
| WO | VWO2009004574 | A1 | 1/2009 |
| WO | WO2010037104 | A2 | 4/2010 |
| WO | WO2010085783 | A1 | 7/2010 |
| WO | WO2010085784 | A2 | 7/2010 |
| WO | WO2010094039 | A2 | 8/2010 |
| WO | WO2010099178 | A2 | 9/2010 |
| WO | WO2010099194 | A2 | 9/2010 |
| WO | WO2011026186 | A1 | 3/2011 |
| WO | WO2011035370 | A1 | 3/2011 |
| WO | WO2011044640 | A1 | 4/2011 |
| WO | WO2011060487 | A1 | 5/2011 |
| WO | WO2011143720 | A1 | 11/2011 |
| WO | WO2016000546 | A1 | 1/2016 |
| WO | WO2017165543 | A1 | 9/2017 |

OTHER PUBLICATIONS

Analog Devices, ADV212: JPEG 2000 Video Codec, http://www.analog.com/en/audiovideo-products/video-compression/ADV212/products/pr . . . , accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

Teravision Corp, LCD-TV Panel Control Board Specification, Nov. 2007, 24 pages.

Texas Advanced Optoelectronic Solutions Inc., TCS230 Programmable Color Light-To-Frequency Converter, Dec. 2007, 12 pages.

Texas Advanced Optoelectronic Solutions Inc., TCS3404CS, TCS3414CS Digital Color Light Sensors, Feb. 2009, 38 pages.

Wikipedia, Color rendering index, https://en.wikipedia.org/wiki/Color_rendering_index, accessed Aug. 25, 2016, 13 pages.

Wikipedia, Gamut, https://en.wikipedia.org/wiki/Gamut, accessed Aug. 25, 2016, 8 pages.

Wikipedia, Gradient-index optics, https://en.wikipedia.org/wiki/Gradient-index_optics, accessed Aug. 25, 2016, 5 pages.

\* cited by examiner

MONOLITHIC DISPLAY WITH SEPARATELY CONTROLLABLE SECTIONS

CROSS-REFERENCE TO RELATED APPLICATIONS

This application claims priority to U.S. Application No. 62/140,164 filed on Mar. 30, 2015 which is herein incorporated by reference in its entirety.

TECHNICAL FIELD

Embodiments generally relate to electronic displays used for advertising and point of sale applications.

BACKGROUND OF THE ART

Large electronic display assemblies have traditionally used an array of multiple separate electronic displays, each having their own video driver, timing and control board, as well as other electronics necessary to operate each display. A border or bezel is generally placed between each separate display in order to secure each display into the overall assembly. The bezels can be unattractive to the eye as they can provide a static shape that cannot change, they take up space that otherwise could be used for images, and they also prevent a seamless image to be shown across the separate displays.

SUMMARY OF THE EXEMPLARY EMBODIMENTS

Exemplary embodiments provide a single monolithic electronic display which can be driven with a single video player and TCON to create a number of separately controllable areas on the electronic display. The number and shape of the separate areas can change, resulting in a more attractive and dynamic electronic display assembly that contains less overall components and may be less expensive to operate for the user.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
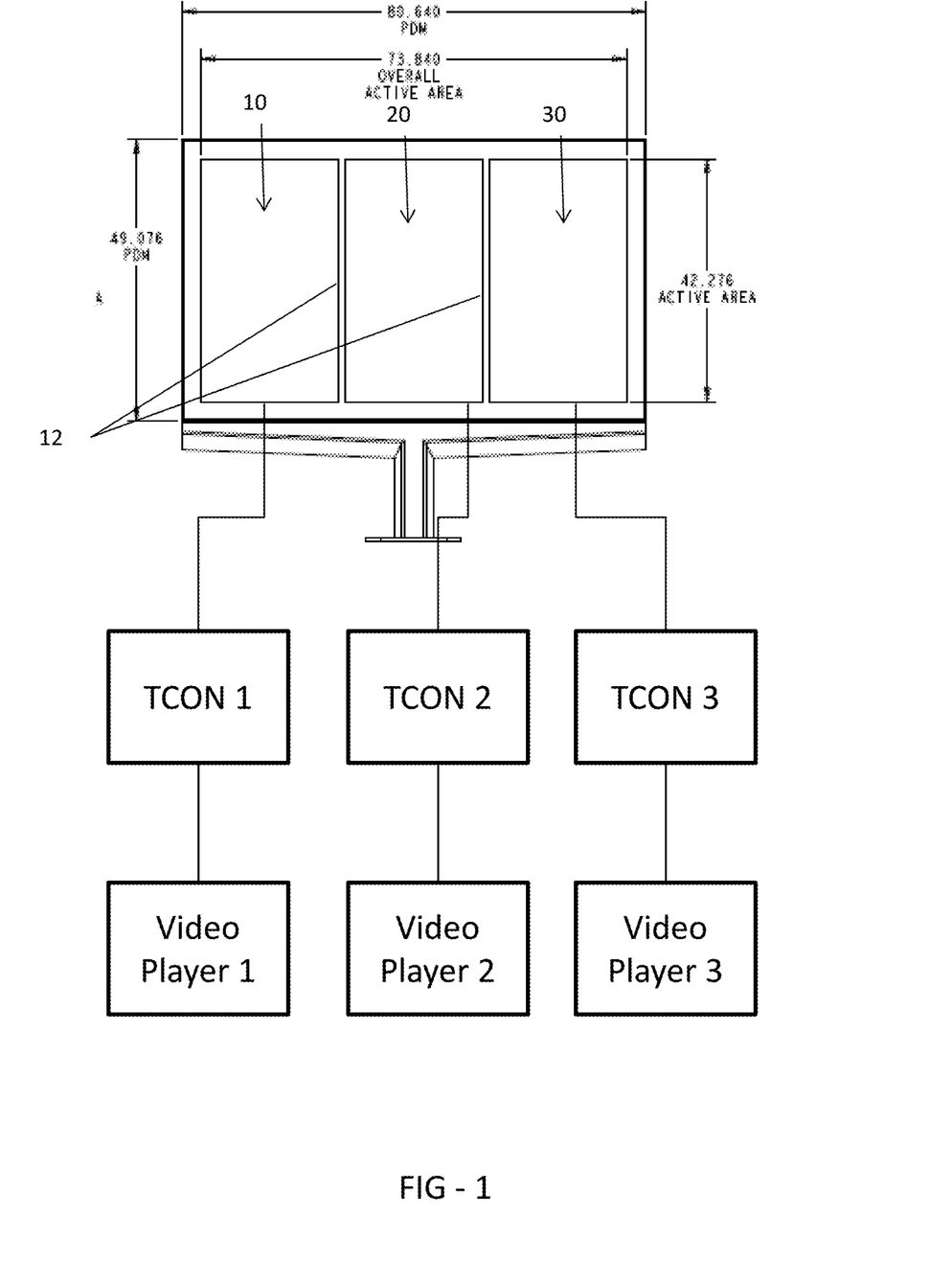
FIG. 1 is a simplified bock diagram of a traditional array of electronic displays.

FIG. 1 is a simplified bock diagram of a traditional array of electronic displays. Three separate displays 10, 20, and 30 are placed in a 1×3 array and contained within a housing that places a portion of the bezel 12 in between each display. Display 10 requires its own video player 1 and timing and control board (TCON) 1. Similarly, display 20 requires its own video player 2 and TCON 2. Finally, display 30 also requires its own video player 3 and TCON 3. For users of this device, there are some primary concerns. First, the user must keep all three sets of components operating to ensure that each display 10, 20, and 30 continues to operate. Second, software licenses for graphical content are typically driven by the number of video players providing the content. In this situation, the user of the device would be paying for three separate licenses, one each for players 1, 2, and 3.

Figure 2:
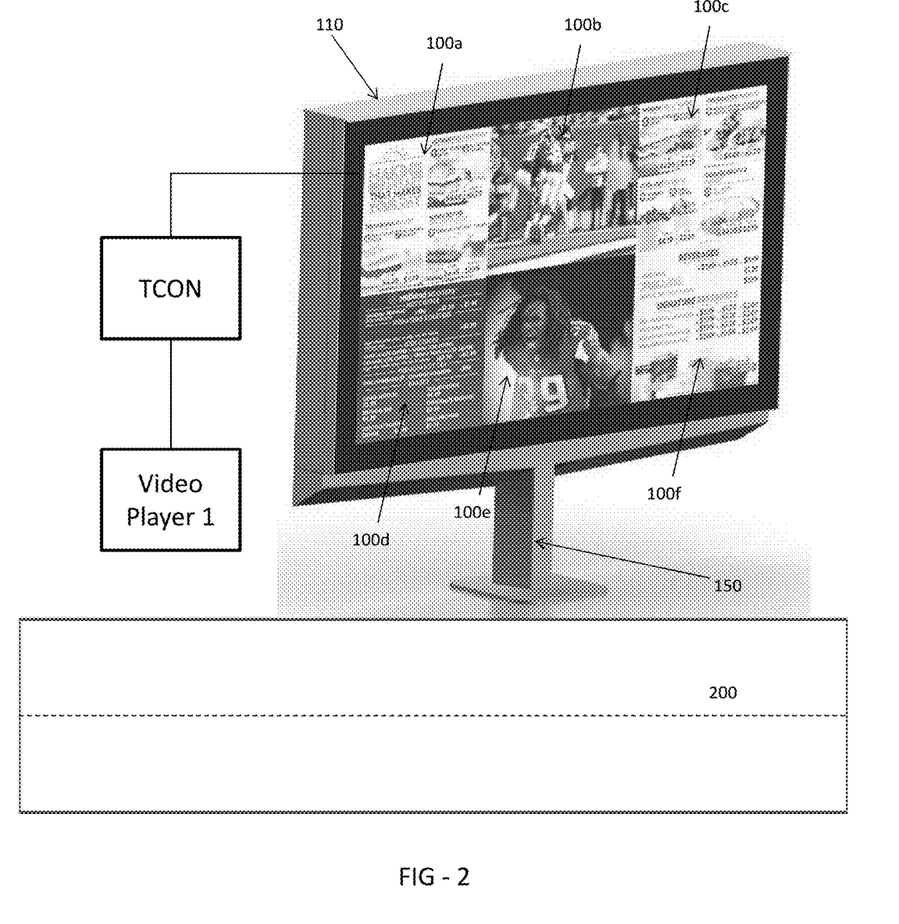
FIG. 2 is a simplified block diagram of an exemplary embodiment of the monolithic display assembly.

FIG. 2 is a simplified block diagram of an exemplary embodiment of the monolithic display assembly. Here, a single monolithic display 110 is contained within a housing. The assembly lacks the bezels which would need to be placed between each display. The display 110 can be driven in separately controllable areas 100a-100f, where in this case each area is being driven to show a different image. This assembly only requires a single video player and TCON in order to generate these different images within the areas 100a-100f. The display 110 is also preferably mounted on a pedestal 150 which attaches to the housing of the display 110. As shown, this embodiment is placed adjacent to a traditional drive-through lane 200 for a fast food or other type of quick service restaurant.

Figure 3:
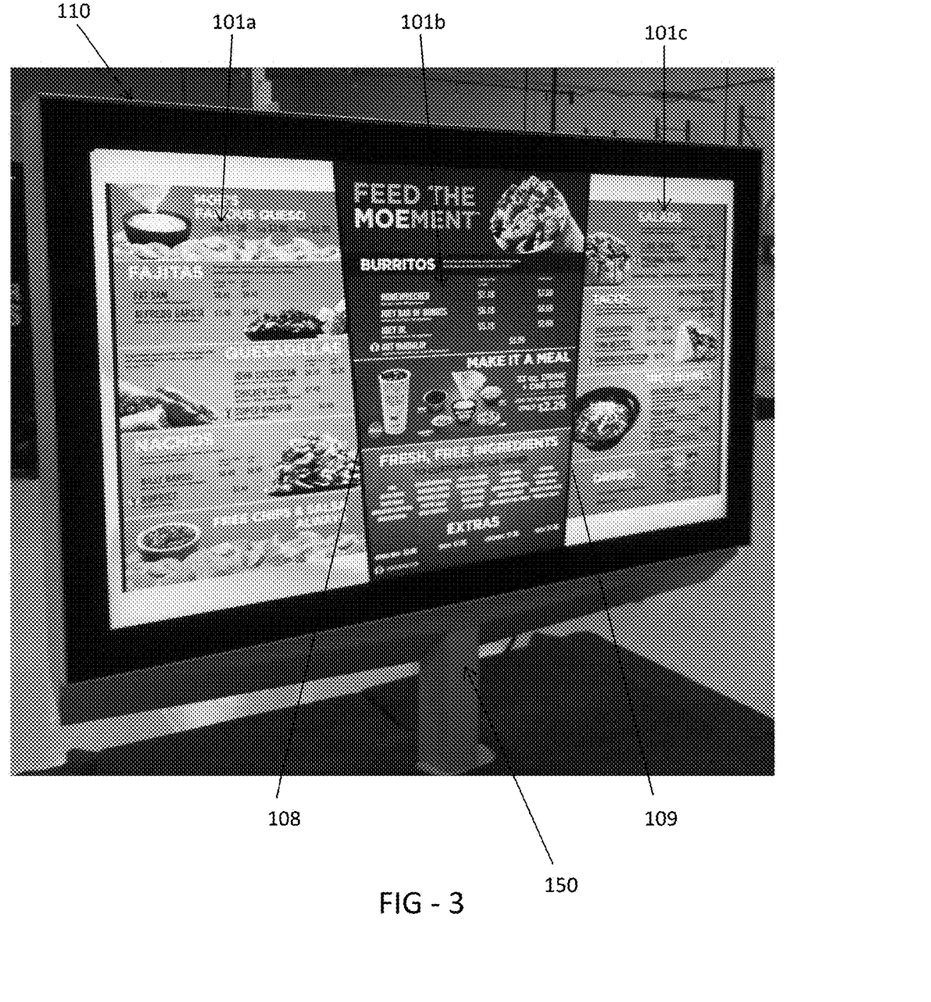
FIG. 3 is a perspective illustration of the embodiment shown in FIG. 2 where the images on the display create the appearance of a dynamic bezel shape.

FIG. 3 is a perspective illustration of the embodiment shown in FIG. 2 where the images on the display 110 create the appearance of a dynamic bezel shape. Here, three separate image areas 101a-101c are used to show three separate images to the viewer. In this embodiment, a bezel 108 is visually created between area 101a and 101b. Similarly, a bezel 109 is visually created between area 101b and 101c. These bezels 108/109 are not positioned vertically, which is generally done when building physical bezels. Instead, the bezels 108/109 are angled relative to the top (or bottom) of the display 110, rather than being positioned generally perpendicular to the top (or bottom) of the display 110.

Because these are only visual bezels 108/109, they can appear or disappear between the image areas. They can also move dynamically to create a more fluid and dynamic effect. For example, the bezels 108/109 could rotate from the shown position until they are substantially vertical or perhaps rotating past vertical until they are angled towards the opposite direction. The bezels 108/109 can then rotate back to the shown position, in order to draw the viewer's eye and present a more exiting overall display.

Figure 4:
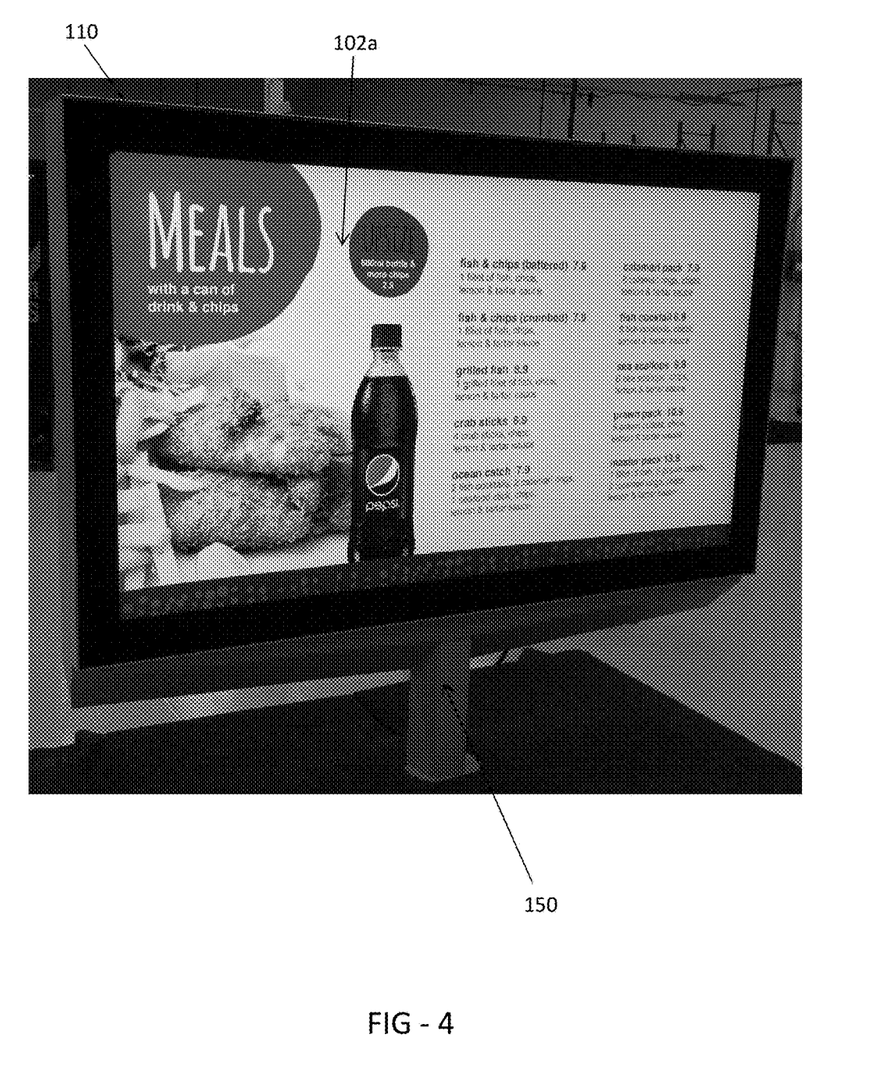
FIG. 4 is a perspective illustration of the embodiment shown in FIG. 2 where the electronic display is creating a large monolithic image across the entire display.

FIG. 4 is a perspective illustration of the embodiment shown in FIG. 2 where the electronic display 110 is creating a large monolithic image across the entire display 110. In this embodiment, the display 110 creates only a single image area 102a which is defined substantially by the entire available area of the display 110 itself. The visual bezels 108/109 shown above have been removed to provide one large seamless image across the substantial entirety of the display 110.

Figure 5:
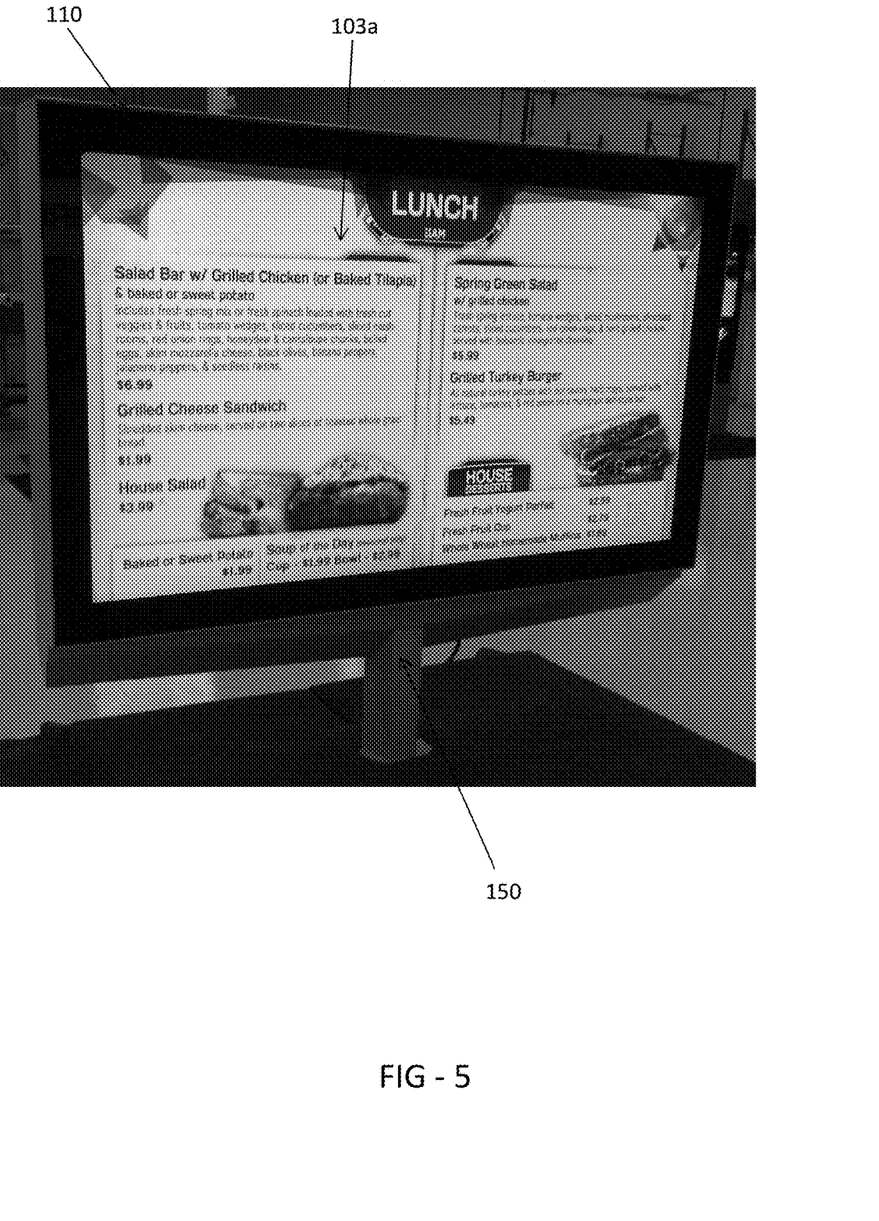
FIG. 5 is a second perspective illustration of the embodiment shown in FIG. 2 where the electronic display is creating a large monolithic image across the entire display.

FIG. 5 is a second perspective illustration of the embodiment shown in FIG. 2 where the electronic display 110 is creating a large monolithic image across the entire display 110. This figure shows a similar situation as FIG. 4 above, where the display 110 creates only a single image area 103a which is defined substantially by the entire available area of the display 110 itself.

Figure 6:
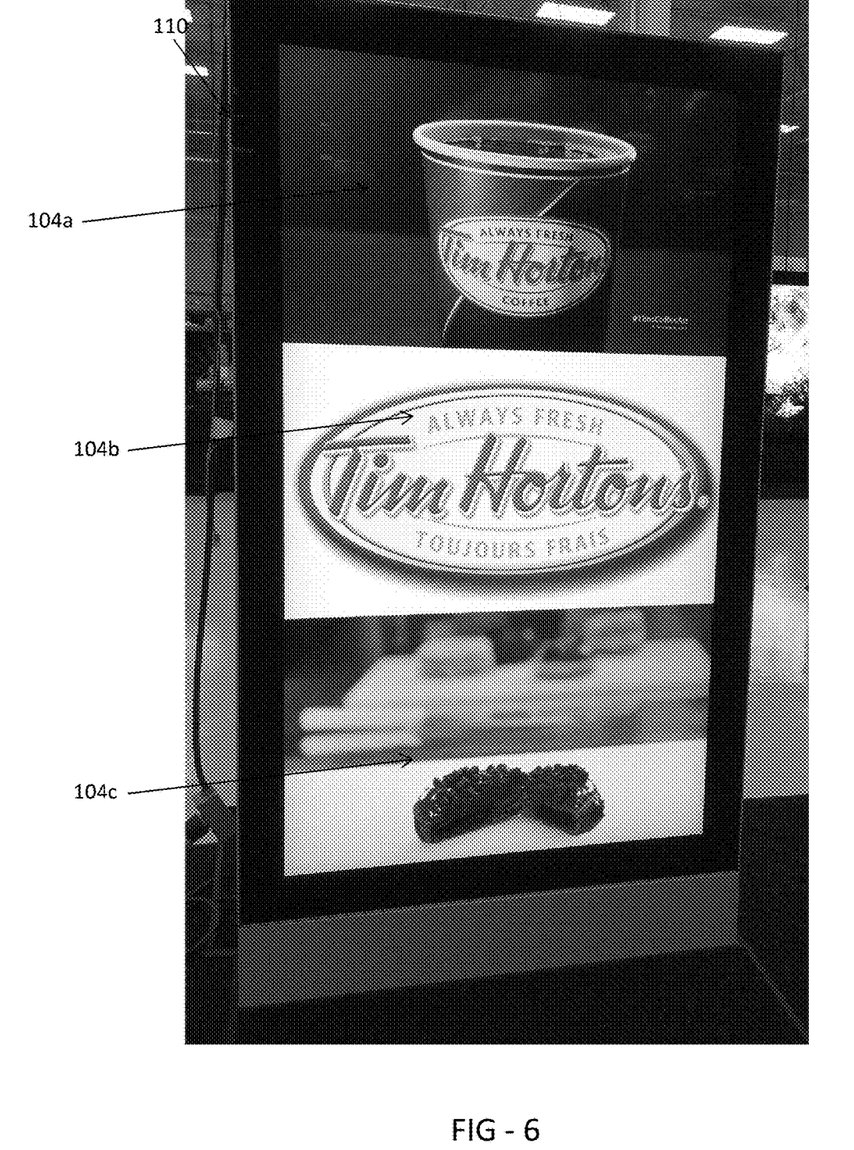
FIG. 6 is a front elevation view of the embodiment shown in FIG. 2 where the display has been oriented in a portrait fashion and showing separately controllable sections within the display.

FIG. 6 is a front elevation view of the embodiment shown in FIG. 2 where the display 110 has been oriented in a portrait fashion and showing separately controllable sections 104a-104c within the display 110. Here, while the display 110 has been reoriented, the graphics are shown to adjust with the rotation of the display 110. While the previous embodiments have shown a display with a landscape orientation and image areas which had a portrait orientation, in this embodiment the display is shown with a portrait orientation while the image areas 104a-104c are shown with a landscape orientation. The exemplary embodiments allow for an increased amount of flexibility in designing the image areas while not being constrained by a bezel or the layout of individual displays within an array.

Figure 7:
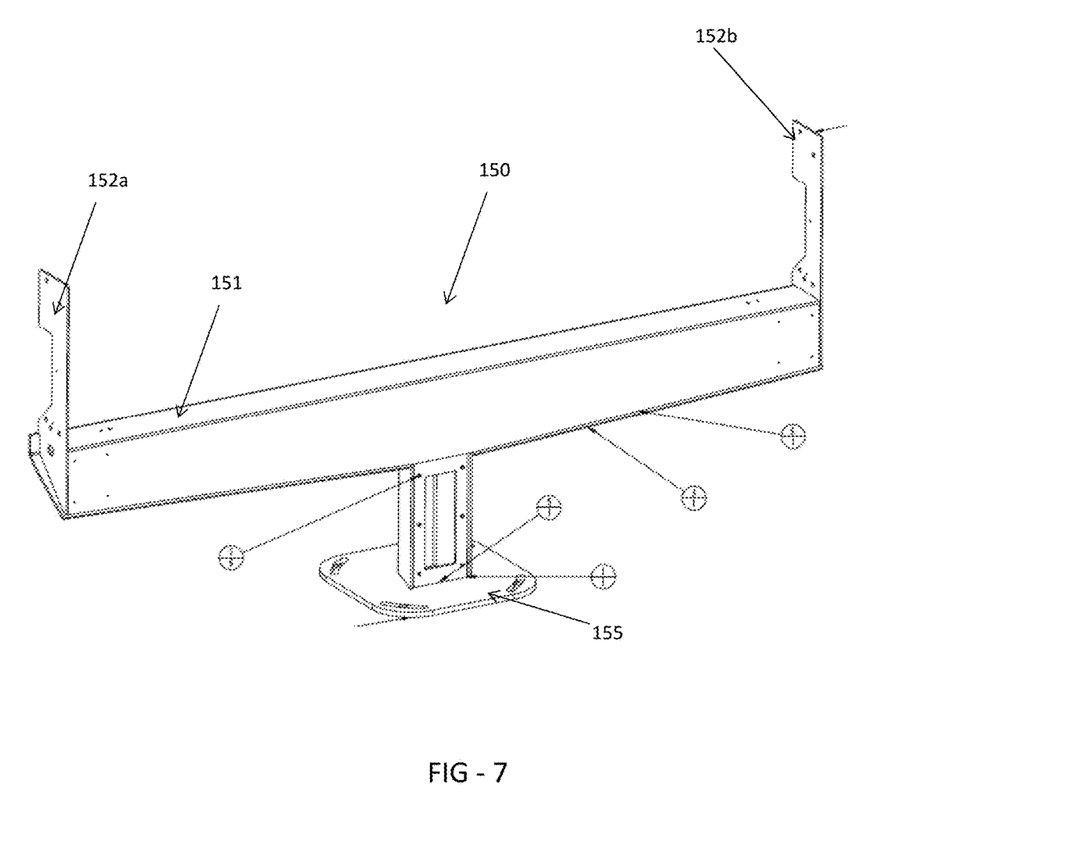
FIG. 7 is a perspective view of one embodiment for the pedestal.

FIG. 7 is a perspective view of one embodiment for the pedestal 150. A first substantially flat portion 155 may be attached to a substantially flat surface on or near the ground while a second substantially flat portion 151 is elevated above and is adapted to accept and support the housing for the display 110. A pair of wings 152a/152b preferably extend upwardly from the flat surface 151 and are positioned to surround and attach with the sides of the display housing.

Figure 8:
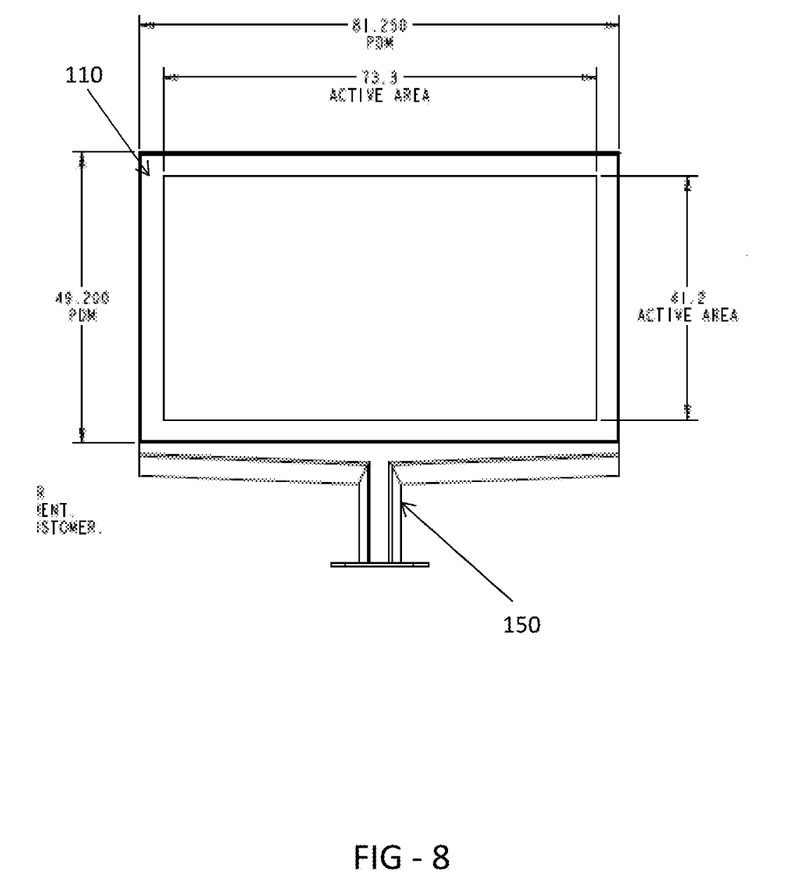
FIG. 8 is a front elevation view of another embodiment of the monolithic display assembly and showing suggested dimensions.

FIG. 8 is a front elevation view of another embodiment of the monolithic display assembly and showing suggested dimensions. The PDM dimensions represent the dimension of the display housing itself while the active area dimensions represent the area of the display which is visible to an observer.

The electronic display 110 can be any flat panel electronic display including but not limited to: liquid crystal displays (LCD), organic light emitting diode (OLED) displays, plasma displays, and electroluminescent polymer displays.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. An electronic display assembly comprising:
a monolithic electronic display panel; and
a single video player in electrical connection with a single timing and control board (TCON), which is in electrical connection with the monolithic electronic display panel, the single video player and TCON configured to:
simultaneously produce multiple individual images on the monolithic electronic display panel, the multiple individual images comprising content selected from the group consisting of still images, full motion video, and combinations thereof, and
produce a simulated bezel graphic that appears between each of the multiple individual images, the simulated bezel graphic being dynamic in nature such that the bezel graphic is visually movable in correspondence with changes in appearance of the multiple individual images on the monolithic electronic display panel.

2. The assembly of claim 1 further comprising:
a first area on the electronic display that displays still images, and
a second area on the electronic display that displays full motion video simultaneously with the still images of the first area.

3. The assembly of claim 2 further comprising:
a third area on the electronic display that displays still images that are different from the still images shown in the first area, and
a fourth area on the electronic display that displays full motion video that is different from the full motion video shown in the second area.

4. The assembly of claim 2 wherein:
the single video player and TCON transmits still images to the first area of the electronic display while transmitting full motion video to the second area of the electronic display.

5. The assembly of claim 1 wherein:
the simulated bezel graphic is visibly rotatable between multiple orientations.

6. The assembly of claim 1 wherein:
the simulated bezel graphic is controllable separately from the image content on the monolithic electronic display panel.

7. The assembly of claim 2 wherein:
the first area on the electronic display has a non-rectangular shape.

8. The assembly of claim 1 wherein:
the simulated bezel graphic is oriented vertically between the first and second areas of the electronic display.

9. The assembly of claim 1 wherein:
the simulated bezel graphic is oriented horizontally between the first and second areas of the electronic display.

10. The assembly of claim 1 wherein:
the simulated bezel graphic is oriented at least 5 degrees from vertical between the first and second areas of the electronic display.

11. An electronic display assembly comprising:
a monolithic electronic display panel positioned adjacent to a drive through lane at a quick service restaurant; and
a single video player in electrical connection with a single timing and control board (TCON), which is in electrical connection with the monolithic electronic display panel;
wherein the monolithic electronic display contains a first area that receives from the single video player content selected from the group consisting of still images and full motion video, and a second area that receives from the single video player content selected from the group consisting of still images and full motion video, the content of the first area shown simultaneously with the content of the second area; and
a dynamically movable simulated bezel graphic produced by the single video player, the simulated bezel graphic located between and separating the first area and the second area of the monolithic electronic display and being visibly rotatable between multiple orientations in conjunction with changes in appearance of the first area and the second area of the monolithic electronic display.

12. The assembly of claim 11 wherein:
the first area and the second area are non-rectangular in shape.

13. The assembly of claim 11 wherein:
the simulated bezel graphic is oriented vertically between the first and second areas of the monolithic electronic display.

14. The assembly of claim 11 wherein:
the simulated bezel graphic is oriented horizontally between the first and second areas of the monolithic electronic display.

15. The assembly of claim 14 wherein:
the simulated bezel graphic is visibly rotatable to any orientation between a horizontal and vertical orientation.

16. The assembly of claim 11 wherein:
the simulated bezel graphic is oriented at least 5 degrees from vertical between the first and second areas of the monolithic electronic display.

17. An electronic display assembly comprising:
an electronic display panel positioned adjacent to a drive through lane at a quick service restaurant, separately controllable areas A, B, and C present on the display panel; and
a single video player in electrical connection with a single timing and control board (TCON), which is in electrical connection with display areas A, B, and C;
wherein area A will receive still images, area B will receive full motion video, and area C will receive additional still images that are different from those in area A, such that all three areas A, B, and C are will simultaneously show still images and/or video received from the single video player and TCON; and
wherein the single video player and TCON also displays a dynamically movable simulated bezel graphic that is located between and separates each of areas A, B and C, the simulated bezel graphic being visibly rotatable between multiple orientations in conjunction with changes in appearance of areas A, B and C.

18. The assembly of claim 17 wherein:
the single video player and TCON are adapted to transmit a single still image to be shared across areas A, B, and C for a certain time period, before reverting back to a state where area A receives still images, area B receives full motion video, and area C receives additional still images that are different from those in area A.

19. The assembly of claim 17 wherein:
the changes in appearance of areas A, B and C are changes in the shape or location of areas A, B, and C.

20. The assembly of claim 17 wherein:
areas A, B, and C have non-rectangular shapes.

* * * * *

UNITED STATES PATENT AND TRADEMARK OFFICE
CERTIFICATE OF CORRECTION

PATENT NO. : 10,319,408 B2
APPLICATION NO. : 15/084968
DATED : June 11, 2019
INVENTOR(S) : William Dunn Page 1 of 1

It is certified that error appears in the above-identified patent and that said Letters Patent is hereby corrected as shown below:

On the Title Page

Page 4, References Cited, Foreign Patent Documents, Line 8 please delete "WO NWO2006089556 A1 8/2006" and insert --WO WO2006089556 A1 8/2006--.

Page 4, References Cited, Foreign Patent Documents, Line 10 please delete "WO VWO2009004574 A1 1/2009" and insert --WO WO2009004574 A1 1/2009--.

Signed and Sealed this
Thirtieth Day of July, 2019

Andrei Iancu
*Director of the United States Patent and Trademark Office*